United States Patent
Nakajima

(10) Patent No.: US 7,430,522 B2
(45) Date of Patent: Sep. 30, 2008

(54) EXCHANGE RATE CALCULATOR

(75) Inventor: Keiichi Nakajima, Tokyo (JP)

(73) Assignee: SOFTBANKBB Corp., Tokyo (JP)

( * ) Notice: Subject to any disclaimer, the term of this patent is extended or adjusted under 35 U.S.C. 154(b) by 0 days.

(21) Appl. No.: 11/735,174

(22) Filed: Apr. 13, 2007

(65) Prior Publication Data

US 2007/0185772 A1 Aug. 9, 2007

Related U.S. Application Data

(63) Continuation of application No. PCT/JP2004/015737, filed on Oct. 22, 2004.

(51) Int. Cl.
G06Q 30/00 (2006.01)
G07G 1/14 (2006.01)

(52) U.S. Cl. ........................................ 705/14
(58) Field of Classification Search .................... 705/14
See application file for complete search history.

(56) References Cited

U.S. PATENT DOCUMENTS

| | | | | |
|---|---|---|---|---|
| 5,117,355 | A | * | 5/1992 | McCarthy ................. 705/14 |
| 5,774,870 | A | * | 6/1998 | Storey ..................... 705/14 |
| 5,937,391 | A | * | 8/1999 | Ikeda et al. ............... 705/14 |
| 2001/0054003 | A1 | * | 12/2001 | Chien et al. .............. 705/14 |
| 2004/0122736 | A1 | * | 6/2004 | Strock et al. ............. 705/14 |
| 2004/0193489 | A1 | * | 9/2004 | Boyd et al. .............. 705/14 |
| 2007/0118470 | A1 | * | 5/2007 | Warren et al. ............ 705/38 |

FOREIGN PATENT DOCUMENTS

| | | |
|---|---|---|
| JP | 2002-197333 A | 7/2002 |
| JP | 2004-094796 A | 3/2004 |
| JP | 2004-295637 A | 10/2004 |
| WO | 01/79966 A2 | 10/2001 |

OTHER PUBLICATIONS

International Search Report for Int'l Patent Appln. No. PCT/JP2004/015737.

* cited by examiner

*Primary Examiner*—James W Myhre
(74) *Attorney, Agent, or Firm*—Stroock & Stroock & Lavan LLP

(57) ABSTRACT

Provided is a computation apparatus that is able to adequately obtain a relative value of an incentive point issued by each shop, by computing an exchange rate used in exchanging shop points of the shop into common points. The computation apparatus (25) stores a function for defining the exchange rate (250), and internally maintains, for rate computation, the used house point (UHP) that represents a portion of shop points that has been spent (redeemed) in a shop that has issued the shop points), and the active general point (AGP) that represents a portion of common points that is obtained by exchanging shop points and is not spent yet. A rate function is defined so as to yield a higher exchange rate in exchanging shop points of the shop into common points when the used house point (UHP) of the shop is larger, and to yield a lower exchange rate when the active general point (AGP) of the shop is larger.

10 Claims, 11 Drawing Sheets

200

| SHOP ID | ISSUED HOUSE POINT (IHP) | ACTIVE HOUSE POINT (AHP) | USED HOUSE POINT (UHP) | ISSUED GENERAL POINT (IGP) | USED GENERAL POINT (UGP) | ACTIVE GENERAL POINT (AGP) |
|---|---|---|---|---|---|---|
| SHOP YBB | 56,012 | 31,050 | 12,035 | 8,125 | (3,464) | (4,661) |
| SHOP BRT | 45,375 | 43,095 | 1,025 | 930 | (396) | (534) |
| SHOP SBD | 71,669 | 8,211 | 43,265 | 15,625 | (6,663) | (8,962) |
| ⋮ | ⋮ | ⋮ | ⋮ | ⋮ | ⋮ | ⋮ |
| SUM | TOTAL ISSUED HOUSE POINT (ΣIHP) | TOTAL ACTIVE HOUSE POINT (ΣAHP) | TOTAL USED HOUSE POINT (ΣUHP) | TOTAL ISSUED GENERAL POINT (ΣIGP) | TOTAL USED GENERAL POINT (ΣUGP) | TOTAL ACTIVE GENERAL POINT (ΣAGP) |
|  | 173,056 | 82,356 | 56,325 | 24,680 | 10,525 | 14,157 |

*FIG. 3A*

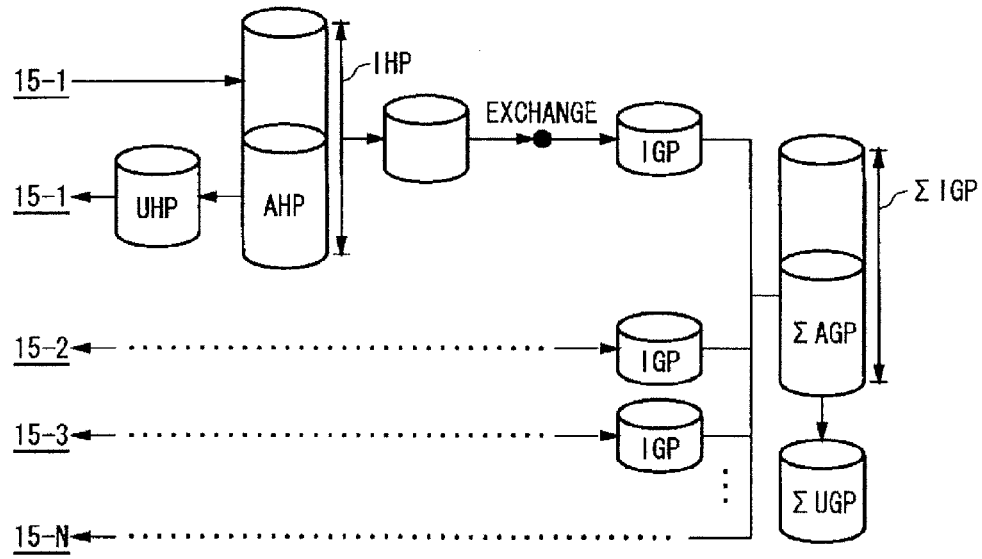

*FIG. 3B*

$$S(r) = \int_0^r \left(\frac{1}{ax+b} - c\right)dx$$

$$= \frac{1}{a}\left\{\log(ar+b) - \log b\right\} - cr \quad \cdots (1)$$

$$S(r) = \frac{\text{ACTIVE HOUSE}}{\text{POINT (AHP)}} \times \frac{\text{USED HOUSE POINT (UHP)}}{\text{ISSUED HOUSE POINT (IHP)}} \quad \cdots (2)$$

$$r = \text{ACTIVE HOUSE POINT (AHP)} \quad \cdots (3)$$

| TAG ID / LOG ID | A-1234-5678 | | | | ... | 210 |
|---|---|---|---|---|---|---|
| | SHOP ID | ISSUED DATE | EXPIRATION DATE | ACQUIRED POINTS | ... | SHOP ID |
| 1 | YBB | 040631 | 050631 | 25 | | |
| 2 | BRT | 040703 | 041203 | 100 | | |
| 3 | SBD | 040803 | 050803 | 50 | | |
| 4 | SBD | 040821 | 050821 | 150 | | |
| 5 | G-SBD | 040821 | 050821 | 25 | | |
| 6 | G-YBB-SBD | 040821 | 050821 | 50 | | |
| ... | | | | | | |

$$f(x) = \frac{1}{ax+b} - c \quad \cdots (1)$$

$$S(\alpha) = \int_0^\alpha f(x)\,dx \quad \cdots (2)$$

$$S(\alpha) = [\text{ACTIVE GENERAL POINT}] \quad \cdots (3)$$

$$\alpha, f(\alpha) = [\text{EXCHANGE RATE}]$$

EXCHANGE RATE CALCULATOR

CROSS REFERENCE TO RELATED APPLICATION

This is a continuation application of PCT/JP2004/015737 filed on Oct. 22, 2004, the contents of which are incorporated herein by reference.

BACKGROUND

1. TECHNICAL FIELD

The present invention relates to a computation apparatus, a computation method, and a program. In particular, the present invention relates to a computation apparatus, a computation method, and a program, which are for computing an exchange rate used in exchanging shop points issued for each shop and usable for payment for the shop into common points common to each shop.

2. Related Art

There have conventionally been services of providing customers who purchased goods at a shop with shop points usable for the next payment directed to the shop. This service gives incentives to customers to come back to the shop because the next payment will be discounted. In this way, this service is an attempt by a shop to secure customer patronage. Accordingly, it has been common that the shop points obtained for one shop are only usable in the shop.

However, such shop point service is currently adopted by an extremely large number of shops, and the market thereof is in the saturation state. Customers have to keep control of shop points for each different shop, which is a complicated task. The sales promotion effect for shops is also limited since they have to compete against many other shops pertaining to this service, and management distinctive from other shops requires complicated tasks. As opposed to this, adoption of common points usable in common to each of shops has been proposed so as to elevate the values of the shop points as well as to enhance the sales promotion effect of the shop points (e.g. the following patent document 1).

<Patent document 1> Japanese Patent Application Publication No. 2002-197333

However, it is extremely difficult to define a common point value common to shops, because shop points are inherently issued based on the original set of values of a certain shop, and so a practical scheme has not yet been proposed. For example, it is difficult to adequately define an exchange rate used in exchanging shop points for one shop into common points.

In view of the above, an advantage of the present invention is provision of a computation apparatus, a computation method, and a program, which are able to solve the above-stated problems. This advantage is achieved by a combination of the disclosures of the independent claims provided in the claims. The dependent claims also define further advantageous examples of the present invention.

SUMMARY

In order to solve the above described problems, a first aspect of the present invention provides a computation apparatus for computing an exchange rate used in exchanging one or more shop points into one or more common points, the shop points being issued for each shop and usable for payment to the shop, and the common points being usable for payment common to each shop, the computation apparatus including: a shop point storage unit that stores, in association with each shop, a used house point (UHP) and an active general point (AGP), the used house point (UHP) representing a portion of shop points issued by the shop and has been already used for payment to the shop, and the active general point (AGP) representing a portion of common points that is exchanged from shop points issued by the shop and has not been yet used for payment to any shop; a function storage unit that stores, for each shop, a function for an exchange rate that a) when the used house point (UHP) of the shop is larger, computes an exchange rate with which shop points of the shop are exchanged into a larger number of common points, and b) when the active general point (AGP) of the shop is larger, computes an exchange rate with which shop points of the shop are exchanged into a smaller number of common points; and an exchange rate computation unit that, for each shop, computes an exchange rate, based on the used house point (UHP) and the active general point (AGP) of the shop stored in the shop point storage unit and by using the function of the shop stored in the function storage unit.

An arrangement is also possible in which the shop point storage unit further stores, for each shop, an issued house point (IHP) and an active house point (AHP), the issued house point (IHP) representing an amount of shop points issued by the shop, and the active house point (AHP) representing a portion of the issued house point (IHP) not yet used for any of payment and exchange, the function stored by the function storage unit is an attenuation function that yields, for each shop, an exchange rate that decreases according to increase in exchange-target shop points for the shop, the function having a tendency of a) yielding a greater attenuation rate when a ratio of the used house point (UHP) to the issued house point (IHP) for the shop is lower, b) yielding a greater attenuation rate when the active house point (AHP) for the shop is larger, and c) yielding a smaller attenuation rate when both of the used house point (UHP) and the issued house point (IHP) increase, and the exchange rate computation unit, using the attenuation function, obtains a shop point corresponding to an end point of an integral interval of which an integral value obtained by integration from a maximum exchange rate is equal to the active general point (AGP), and computes, as the exchange rate, a function value of the attenuation function that corresponds to the end point of the integral interval.

An arrangement is also possible in which when an amount of exchange-target shop points is designated, the exchange rate computation unit computes a ratio of an amount of common points obtained by exchanging the designated amount of exchange-target shop points with respect to the designated amount of exchange-target shop points, as the exchange rate.

Further, an arrangement is also possible in which the computation apparatus further includes: a user point storage unit that stores, for each user, an amount of shop points owned by the user, and an amount of common points owned by the user; and a point exchange processing unit that a) adds, to the amount of common points stored in the user point storage unit, a value obtained by multiplying the amount of exchange-target shop points by the exchange rate, and b) subtracts the amount of exchange-target shop points, from the amount of shop points stored in the user point storage unit.

An arrangement is also possible in which the point exchange processing unit a) adds, to the amount of shop point stored in the user point storage unit, a value obtained by multiplying an amount of exchange-target common points by an inverse number of the exchange rate, and b) subtracts the amount of exchange-target common points, from the amount of common points stored in the user point storage unit.

An arrangement is also possible in which when any shop points are exchanged into common points, the point exchange processing unit further updates the active general point (AGP) stored in the shop point storage unit.

An arrangement is also possible in which the function storage unit stores a function whose coefficient is defined based on at least one of a predetermined exchange-rate upper-limit value and a predetermined exchange-rate lower-limit value.

An arrangement is also possible in which the function storage unit stores, for each shop, a function for an exchange rate that sets, as an upper limit value of the active general point (AGP) of the shop, an amount obtained by multiplying the active house point (AHP) for the shop by a ratio of the used house point (UHP) with respect to the issued house point (IHP) for the shop.

A second aspect of the present invention provides a computation method for computing an exchange rate used in exchanging one or more shop points into one or more common points, the shop points being issued for each shop and usable for payment to the shop, and the common points being usable for payment common to each shop, the computation method including: a shop point storing step of storing, in association with each shop, a used house point (UHP) and an active general point (AGP), the used house point (UHP) representing a portion of shop points issued by the shop and has been already used for payment to the shop, and the active general point (AGP) representing a portion of common points that is exchanged from shop points issued by the shop and has not been yet used for payment to any shop; a function storing step of storing, for each shop, a function for an exchange rate that a) when the used house point (UHP) of the shop is larger, computes an exchange rate with which shop points of the shop are exchanged into a larger number of common points, and b) when the active general point (AGP) of the shop is larger, computes an exchange rate with which shop points of the shop are exchanged into a smaller number of common points; and an exchange rate computation step of, for each shop, computing an exchange rate, based on the used house point (UHP) and the active general point (AGP) of the shop stored in the shop point storing step and by using the function of the shop stored in the function storing step.

A third aspect of the present invention provides a program that causes a computer to function as a computation apparatus for computing an exchange rate used in exchanging one or more shop points into one or more common points, the shop points being issued for each shop and usable for payment to the shop, and the common points being usable for payment common to each shop, the program causing the computer to function as: a shop point storage unit that stores, in association with each shop, a used house point (UHP) and an active general point (AGP), the used house point (UHP) representing a portion of shop points issued by the shop and has been already used for payment to the shop, and the active general point (AGP) representing a portion of common points that is exchanged from shop points issued by the shop and has not been yet used for payment to any shop; a function storage unit that stores, for each shop, a function for an exchange rate that a) when the used house point (UHP) of the shop is larger, computes an exchange rate with which shop points of the shop are exchanged into a larger number of common points, and b) when the active general point (AGP) of the shop is larger, computes an exchange rate with which shop points of the shop are exchanged into a smaller number of common points; and an exchange rate computation unit that, for each shop, computes an exchange rate, based on the used house point (UHP) and the active general point (AGP) of the shop stored in the shop point storage unit and by using the function of the shop stored in the function storage unit.

The above-stated summary does not list all the features essential for the present invention, and sub-combination of the mentioned groups of features may also be considered as the inventions.

BRIEF DESCRIPTION OF THE DRAWINGS

FIGS. 3(a) and 3(b) show one example of a data structure of a shop point storage unit 200.

FIG. 5 shows one example of a data structure of an acquisition history recording unit 210.

DESCRIPTION OF EXEMPLARY EMBODIMENTS

As follows, the invention is described by way of embodiments. The following embodiments do not limit the invention relating to the scope of the claims. Additionally, not all the features or the combinations thereof described in the embodiments are necessarily essential to the solving means of the invention.

Figure 1:
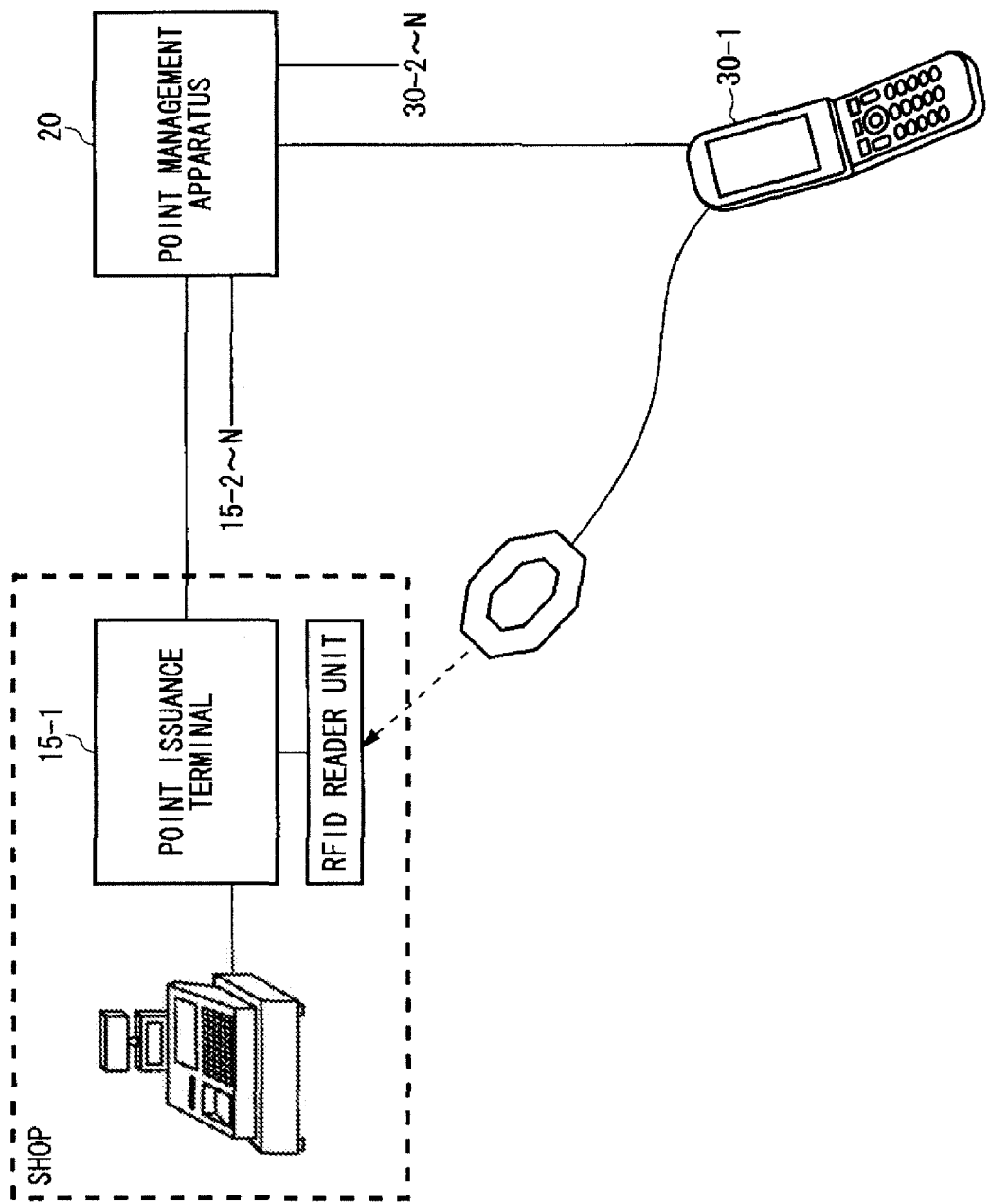
FIG. 1 is a schematic view of a point management system 10.

FIG. 1 is a schematic view of a point management system 10. The point management system 10 is a system for managing issuance and payment of shop point(s) issued by each shop and usable for payment directed to the shop. The point management system 10 aims to adequately compute an exchange rate used in exchanging shop points into common points usable in payment in common to each of shops, based on the demand/supply relation of a variety of points. Note that the following description mainly discusses cases where the number of shop points and the number of common points are respectively plural. However needless to say, the present invention encompasses cases where the number of shop points and the number of common points are respectively singular.

The point management system 10 includes: point issuance terminals 15-1-15-N respectively provided in the shops; a point management apparatus 20 that manages issuance and payment of shop points for the shops; and portable telephones 30-1-30-N provided for and to be carried by users respectively. The point issuance terminal 15-1 inputs an instruction to issue shop points based on an instruction from a cashier of a shop or the like. Specifically, the portable telephone 30-1 is connected to an RFID chip on which a tag ID that identifies a user is recorded. The point issuance terminal 15-1 reads the tag ID from the RFID chip by means of an RFID reader unit, and causes the point management apparatus 20 to record shop points in accordance with the read tag ID.

The point management apparatus 20 is realized by one or more computers, and performs issuance or payment of shop points based on an instruction from the point issuance terminal 15-1. For example, the point management apparatus 20 may issue shop points worth a monetary value corresponding to a predetermined ratio (e.g. 5%) of the purchase amount of sales goods. Furthermore, the point management apparatus 20 performs processing of exchanging the issued shop points into common points. In pursuing the exchange processing, the point management apparatus 20 computes an exchange rate used in exchanging the shop points into common points.

The portable telephone 30-1 acquires information about the remaining shop points or the like from the point management apparatus 20 and displays the acquired information to a user. In addition, the portable telephone 30-1 sends an instruction for exchanging shop points into common points to the point management apparatus 20, in accordance with an input from the user. Since each of the point issuance terminals 15-2-15-N is the same as the point issuance terminal 15-1 except for a shop in which it is provided, and so only the differences are focused in the following explanation. Likewise, each of the portable telephones 30-2-30-N is the same as the portable telephone 30-1 except for a user that carries it, and so only the differences are focused in the following explanation.

Figure 2:
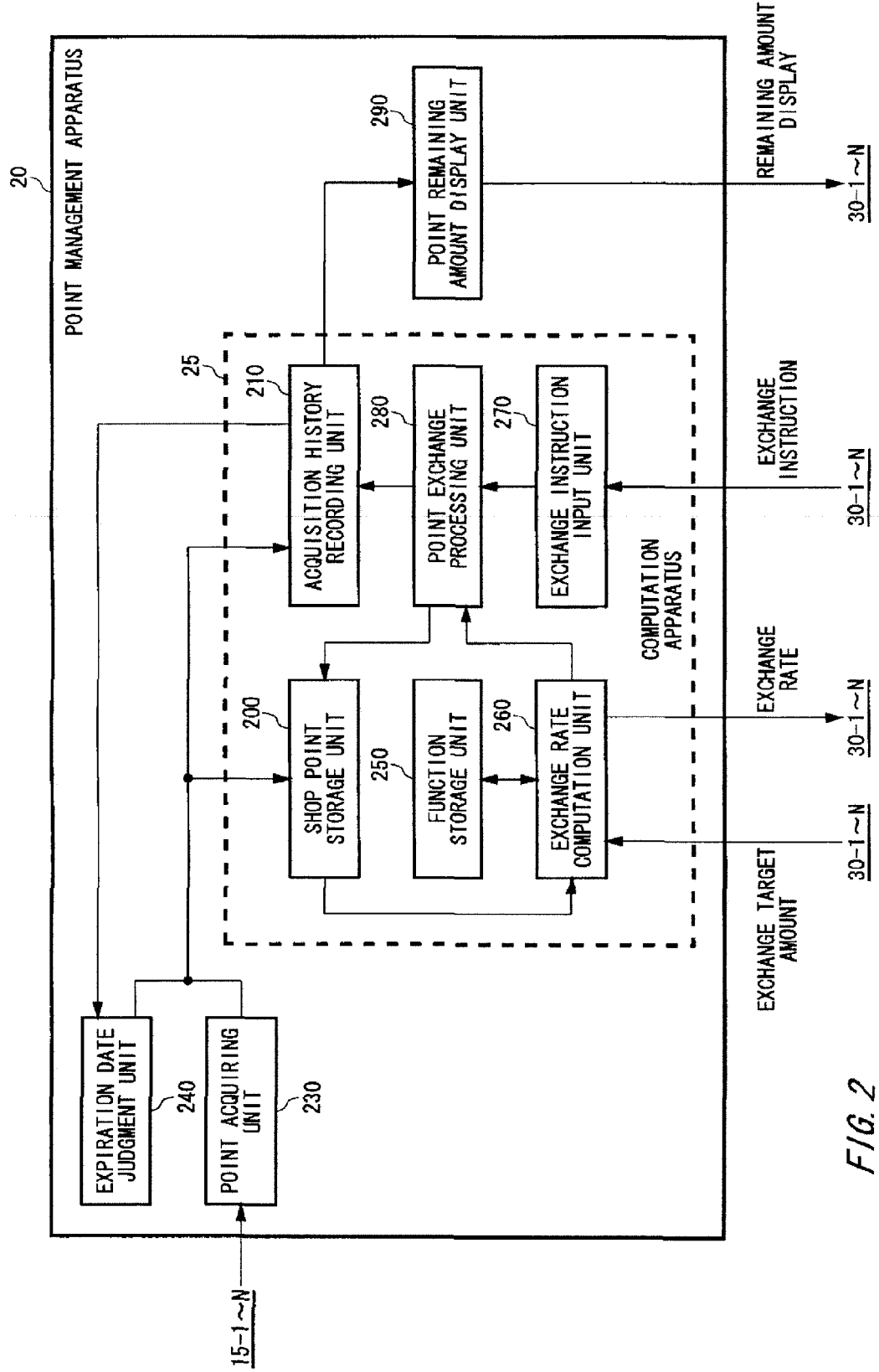
FIG. 2 shows a configuration of a point management apparatus 20 by classifying into functional blocks.

FIG. 2 shows a configuration of the point management apparatus 20 by classifying into functional blocks. The point management apparatus 20 includes a computation apparatus 25, a number-of-points acquiring unit 230, a term-of-validity judgment unit 240, and a point remaining amount display unit 290. The computation apparatus 25 includes a shop point storage unit 200, an acquisition history recording unit 210, a function storage unit 250, an exchange rate computation unit 260, an exchange instruction input unit 270, and a point exchange processing unit 280.

The shop point storage unit 200 stores in association with each shop at least "used house point" (UHP) representing an amount of shop points issued from the shop and already used in payment to the shop. Furthermore, the shop point storage unit 200 stores in association with each shop at least "active general point" (AGP) representing an amount of common points exchanged from shop points issued by the shop but not yet paid to any shop.

The acquisition history recording unit 210 is one example of a user point storage unit according to the present invention. The acquisition history recording unit 210 stores, for each user, the amount of shop points that the user owns, and the amount of common points that the user owns. To be specific, the acquisition history recording unit 210 records the history of the number of points acquired by the number-of-points acquiring unit 230, in association with shop identification information of shops that accept payment by way of the shop points, and a term of validity of the shop points as payment. For example, each time the user acquires any shop points, the acquisition history recording unit 210 may add a new entry to the history so far, to record the number of acquired points, the shop identification information, and the term of validity.

The number-of-points acquiring unit 230 judges whether a user has acquired any shop point issued from a shop, based on an instruction issued by the point issuance terminal 15-1. When the user has acquired some shop point(s), the number-of-points acquiring unit 230 acquires the number of points acquired this time. The term-of-validity judgment unit 240, when the term of validity recorded in the acquisition history recording unit 210 has expired, performs processing to invalidate the shop point(s) corresponding to the expired term of validity in the acquisition history recording unit 210. For example, the term-of-validity judgment unit 240 may delete the entry regarding the shop point(s) of which the term of validity has expired, from the acquisition history recording unit 210.

The function storage unit 250 stores a function used in computing an exchange rate for each shop. Specifically, when a shop's used house point (UHP) is larger, the function is such that shop points of the shop are exchanged into a larger number of common points. Meanwhile, when a shop's active general point (AGP) is larger, the function is such that shop points of the shop are exchanged into a smaller number of common points.

The exchange rate computation unit 260 computes, for each shop, an exchange rate using a function for the shop stored in the function storage unit 250, based on the used house point (UHP) and the active general point (AGP) stored in the shop point storage unit 200. Furthermore, when the amount of exchange-target shop points is designated by the portable telephone 30-1, the exchange rate computation unit 260 may compute the ratio, to the designated amount, of the amount of common points obtained by exchanging the designated amount of shop points, as an exchange rate, and outputs the computed exchange rate to the portable telephone 30-1.

The exchange instruction input unit 270 inputs, via the portable telephone 30-1, an exchange instruction for exchanging shop points into common points. When an exchange instruction is inputted, the point exchange processing unit 280 adds, to the amount of common points managed by the acquisition history recording unit 210, the value obtained by multiplying the amount of exchange-target points by the exchange rate. Then the point exchange processing unit 280 subtracts the amount of exchange-target points from the amount of shop points managed by the acquisition history recording unit 210. Specifically, the point exchange processing unit 280 may select the exchange-target shop points from among already acquired shop points recorded in the acquisition history recording unit 210, and cause already-exchanged indication information indicating that exchange into common points has been already done, to be recorded in association with the selected shop points. Furthermore in such a case, the point exchange processing unit 280 may perform processing to increase the active general point (AGP) stored in the shop point storage unit 200.

Furthermore, the exchange instruction input unit 270 inputs via the portable telephone 30-1 a re-exchange instruction for exchanging common points into shop points. When a re-exchange instruction is inputted, the point exchange processing unit 280 adds, to the amount of shop points managed by the acquisition history recording unit 210, the value obtained by multiplying the amount of exchange-target common points (i.e. common points designated as a target of exchange) by the inverse number of the exchange rate. Then the point exchange processing unit 280 subtracts the amount of the exchange-target common points from the common points managed by the acquisition history recording unit 210.

For each one piece of shop identification information recorded in the acquisition history recording unit 210, the point remaining amount display unit 290 computes the total number of acquired points being a total of the acquired shop points for the shop. Then the point remaining amount display unit 290 transmits the total number of acquired points for each computed shop to the portable telephone 30-1, and displays the same on a screen of the portable telephone 30-1.

FIGS. 3(a) and 3(b) show one example of a data structure of a shop point storage unit 200. FIG. 3(a) shows one example of actually stored data, and 3(b) is a conceptual diagram indicating meaning of each piece of data. The shop point storage unit 200 stores, for each shop, shop identification information (ID) identifying the shop, and "issued house point" (IHP) representing the amount of shop points issued by the shop. Furthermore, the shop point storage unit 200 stores, for each shop, "active house point" (AHP) representing the amount of issued house point (IHP) for the shop left unused for any payment or exchange.

In addition, the shop point storage unit 200 stores, for each shop, "used house point" (UHP) for the shop. In addition, the shop point storage unit 200 stores, for each shop, "issued general point" (IGP) representing the amount of common points obtained by exchange from shop points issued by the shop. In addition, the shop point storage unit 200 stores, for each shop, "used general point" (UGP) representing the amount of the portion of issued house point (IGP) that has been already used for payment. Furthermore, the shop point storage unit 200 stores, for each shop, "active general point" (AGP) for the shop.

As an example, the shop YBB has the issued house point (IHP) of 56012, the active house point (AHP) of 31050, the used house point (UHP) of 12035, the issued general point (IGP) of 8125, the used general point (UGP) of 3464, and the active general point (AGP) of 4661.

In addition, the total issued house point (ΣIHP) representing a sum of issued house points for the shops is 173056, and the total active house point (ΣAHP) representing a sum of active house points for the shops is 82356. Moreover, the total used house point (ΣUHP) representing a sum of used house points for the shops is 56325, and the total issued general point (ΣIGP) representing a sum of issued general points for the shops is 24680, the total used general point (ΣUGP) representing a sum of used general points for the shops is 10525, and the total active general point (ΣAGP) representing a sum of active general points for the shops is 14157.

A concrete example of processing to increase or decrease each numerical value is detailed. The shop point storage unit 200 increases the issued house point (IHP) and the active house point (AHP) when a user has acquired any shop point. In accordance with this, the total issued house point (ΣIHP) and the total active house point (ΣAHP) also increase. Additionally, when the user makes payment by way of shop points, the shop point storage unit 200 increases the used house point (UHP), and decreases the active house point (AHP). In accordance with this, the total used house point (ΣUHP) increases and the total active house point (ΣAHP) decreases.

Furthermore, each time the term of validity has expired, the term-of-validity judgment unit 240 decreases the active house point (AHP). According to this, the total active house point (ΣAHP) decreases. In addition, each time of exchange of shop points into common points, the point exchange processing unit 280 increases the issued general point (IGP), and decreases the active house point (AHP). According to this, the total issued general point (ΣIGP) increases, and the total active house point (ΣAHP) decreases.

In addition, the shop point storage unit 200 increases the total used general point (ΣUGP) each time payment is performed by shop points exchanged from common points. Further, when it is possible to acquire shop identification information of a shop having issued shop points that are exchanged into the common points, the shop point storage unit 200 may increase the used general point (UGP) corresponding to the acquired shop identification information, and decrease the active general point (AGP) corresponding to the shop identification information. Instead of this, the shop point storage unit 200 may increase, according to the ratio of the issued general point (IGP) of each shop to the total issued general point (ΣIGP), the used general point (UGP) for the shop.

For example, the ratio of the issued general point (IGP) for the shop YBB with respect to the total issued general point (ΣIGP) is computed as 8125/24680 (i.e. about 33%). Likewise, the ratio of the issued general points (IGP) for the shops BRI and SBD with respect to the total issued general point (ΣIGP) are respectively computed as 930/24680 (i.e. about 4%) and 15625/24680 (i.e. about 63%). Accordingly, for increasing the total used general point (ΣUGP) by 100 points, the shop point storage unit 200 may increase the used general point (UGP) for the shop YBB by 33 points, increase the used general point (UGP) for the shop BRI by 4 points, and increase the used general point (UGP) for the shop SBD by 63 points.

By computing the used general point (UGP) in this way, it becomes unnecessary to record the shop identification information of a shop that issued shop points that are exchanged into the common points, which leads to saving of the required storage apparatus capacity. In addition, it becomes possible to avoid processing of recording the exchange history in detail every each time shop points are exchanged to common points.

Figures 4A, 4B:
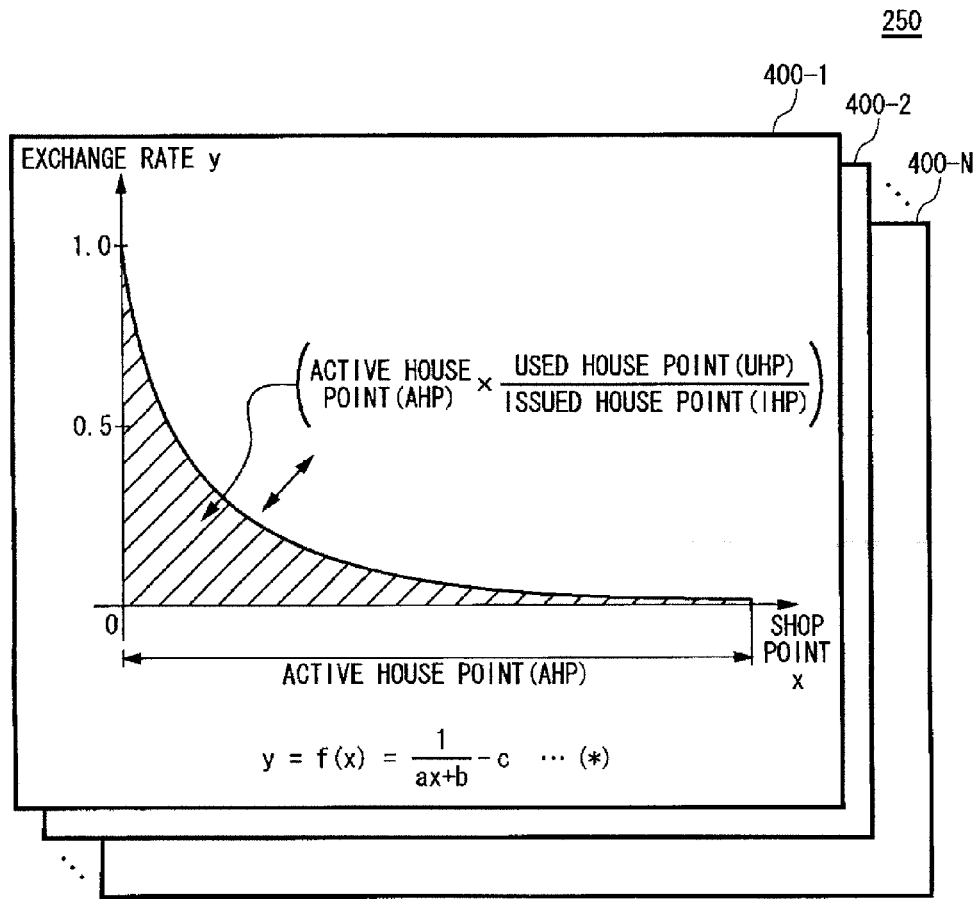
FIGS. 4(a) and 4(b) show a schematic view of functions stored in a function storage unit 250.

FIGS. 4(a) and 4(b) show a schematic view of functions stored in the function storage unit 250. As shown in FIG. 4(a), the function storage unit 250 stores a function used in computing, for each of shops, an exchange rate for a shop point of the shop. This drawing shows function data 400-1-400-N representing these functions. Each function is used to compute the amount of common point obtained by exchanging 1 shop point of each shop. Each of these functions is an attenuation function that yields a decreased exchange rate y as a to-be-exchanged shop point x increases.

The function also has a tendency of representing a larger attenuation rate when the ratio of the used house point (UHP) to the issued house point (IHP) is smaller, and of representing a smaller attenuation rate when both of the used house point (UHP) and the issued house point (IHP) are on the increase. Specifically, this function is determined so that the amount of common points obtained by exchanging all the shop points corresponding to the active house point (AHP) is equal to a value obtained by multiplying the ratio of the used house point (UHP) to the issued house point (IHP) by the active house point (AHP).

This function is represented by a graph on a coordinate axis whose x-axis represents the amount of to-be-exchanged shop points and y-axis represents the exchange rate. This graph presents a curve exhibiting a simple decrease from the upper left to the lower right. The domain of definition of the shop point x in this graph is from 0 to the active house point (AHP). In other words, an exchange rate is computed for each occasion from the first time shop points undergo exchange up to completion of all the shop points.

Then the integral value obtained by integration of all the domain of definition is defined to be equal to the value obtained by multiplying the ratio of the used house point (UHP) to the issued house point (IHP) by the active house point (AHP). The following explains one example of the computation for defining this function based on the issued house point (IHP), the used house point (UHP), and the active house point (AHP). Now suppose that the formula of this function is predetermined as "expression $y=f(x)=(ax+b)^{-1}-c$". Therefore, if the coefficient "a" is a positive number, this function becomes an attenuation function.

FIG. 4(b) shows one example of a method that the exchange rate computation unit 260 uses in defining each coefficient of a function stored in the function storage unit 250. First, the exchange rate computation unit 260 computes the coefficient "b" and the coefficient "c" based on a predetermined exchange-rate upper-limit value and a predetermined exchange-rate lower-limit value.

For example, because the value of the exchange rate takes the upper limit value when the to-be-exchanged shop point is 0, the exchange rate computation unit 260 substitutes x=0 and y=(exchange-rate upper-limit value) into the expression (*). In addition, the value of the exchange rate takes the lower limit value when the to-be-exchanged shop points are equal to the active house point (AHP) in amount. For this reason, x=(active house point) and y=(exchange-rate lower-limit value) are substituted into the expression (*). These series of substitution generate two simultaneous equations. The exchange rate computation unit 260 is able to compute the coefficient "b" and the coefficient "c" based on these simultaneous equations.

When the remaining coefficient "a" is determined, this function is uniquely defined. Now suppose that the active house point (AHP) is "r" (expression (3)), and the value obtained by multiplying, by the active house point (AHP), the ratio of the used house point (UHP) to the issued house point (IHP) is S(r) (expression (2)). In this case, the integral value obtained by integrating this function by the integral interval from 0 to r is represented by the expression (1). By substituting the expression (2) and the expression (3) into this expression (1), a first-degree equation with multiple unknowns by means of the coefficients "a", "b", and "c" is derived. Since the coefficients "b" and "c" are predetermined, the coefficient "a" is determined by solving this equation.

The exchange rate computation unit 260 may perform the above computation each time the issued house point (IHP) or the like is changed, or once in every predetermined period (e.g. once a day), for example. According to this arrangement, the coefficients can be determined in advance, and so computation of the exchange rate is able to be performed immediately when the exchange rate computation is instructed. Alternatively, the exchange rate computation unit 260 may perform the above computation when instructed to perform the exchange rate computation. According to this arrangement, it becomes possible to prevent an occurrence that a computation having been performed later turns out to be unnecessary and so becomes a waste.

FIG. 5 shows one example of a data structure of the acquisition history recording unit 210. The acquisition history recording unit 210, in association with each tag ID identifying a user and for each set of shop points acquired by the user, stores shop identification information (shop ID) for identifying a shop in which the shop points are usable, a term of validity (expiration date), and the number of acquired shop points. In addition to these, the acquisition history recording unit 210 may store information indicating an issued date on which the shop points are issued. In this case, the acquisition history recording unit 210 may store the valid period (e.g. 6 months) instead of the expiration date, and store the combination of the issued date and the valid period as information indicating the expiration date.

For example each time the user acquires any shop point, the acquisition history recording unit 210 adds a new entry to the history so far, to record the number of acquired points, the shop identification information, and the term of validity. For example when the user has acquired any shop points usable for payment to the shop YBB, the acquisition history recording unit 210 records "YBB" being the shop ID of the shop YBB, "040631" indicating the issued date of the shop points, "050631" indicating the term of validity of the shop points, and "25" being the number of acquired points.

Further, when an exchange instruction for exchanging shop points to common points is inputted, the point exchange processing unit 280 causes the acquisition history recording unit 210 to record, in association with the to-be-exchanged shop points, already-exchanged indication information indicating that the shop points have been exchanged into common points. For example, in the log ID No. 5, the point exchange processing unit 280, in association with the shop points usable for payment to the SBD Denki electric store, causes "G" to be recorded as already-exchanged indication information for the shop points. Further in this case, the point exchange processing unit 280 retains a shop ID (i.e. "SBD") stored on record in association with before-exchange shop points, as information indicating a shop ID of a shop having issued the shop points that are to be exchanged into common points. As a result, the acquisition history recording unit 210 records "G-SBD" in the log ID No. 5.

Further, when a re-exchange instruction for exchanging common points into shop points is inputted, the point exchange processing unit 280 updates the already-exchanged indication information for to-be-exchanged common points, with information indicating that the common points have been exchanged into shop points, and a shop ID of a shop that the shop points exchanged from the common points are usable as payment. For example, the acquisition history recording unit 210 records "G-YBB-SBD" indicating that the shop points have been exchanged from common points and indicating the shop ID of the shop that the shop points exchanged from the common points are usable as payment, at the log ID No. 6.

Figure 6:
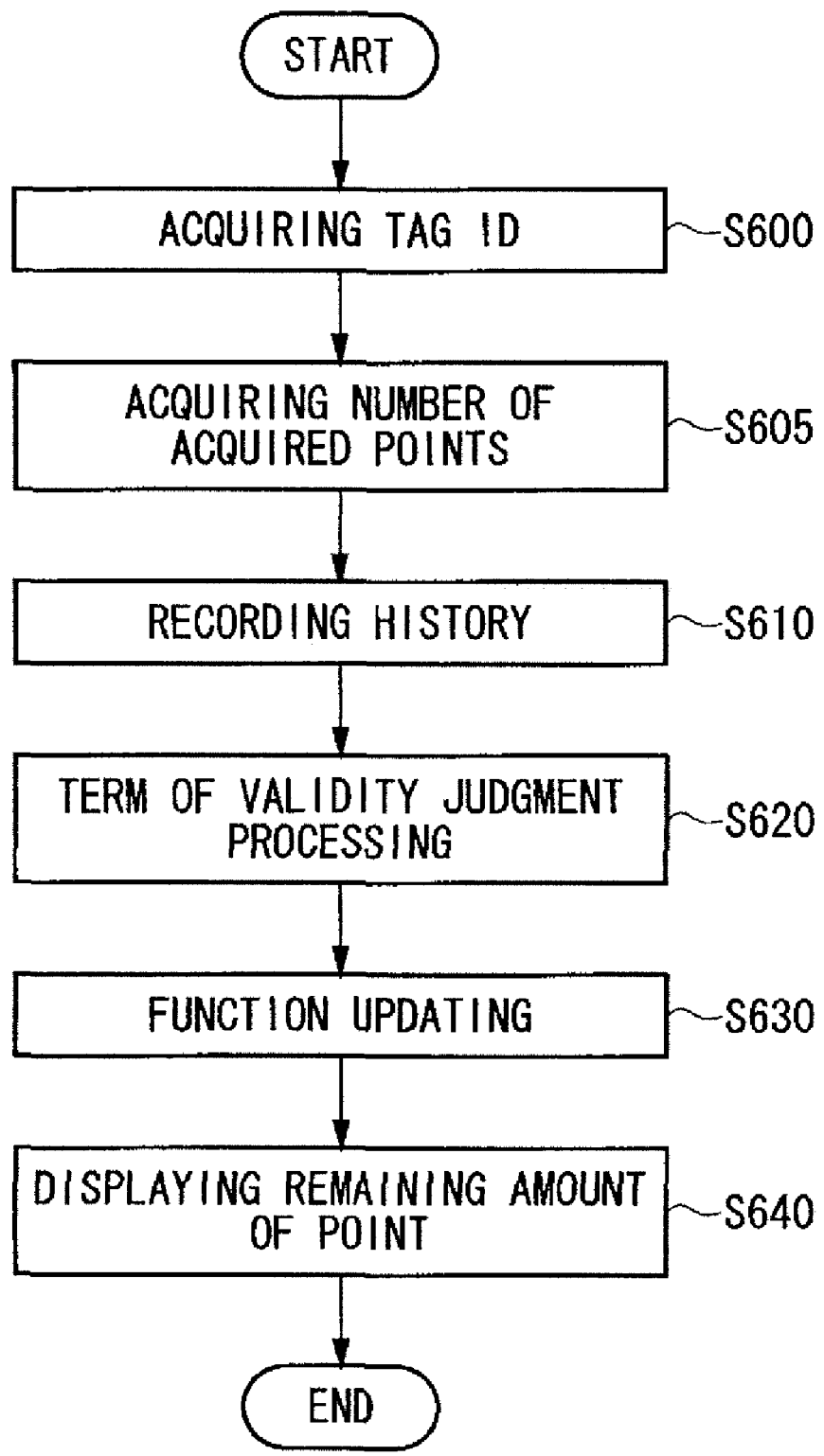
FIG. 6 shows an operational flow of processing performed each time the point management apparatus 20 receives an instruction from a point issuance terminal 15-1.

FIG. 6 shows an operational flow of processing performed each time the point management apparatus 20 receives an instruction from the point issuance terminal 15-1. The point management apparatus 20 acquires a tag ID of an RFID chip of a user, from the point issuance terminal 15-1 (S600). When the user has acquired any shop points, the number-of-points acquiring unit 230 acquires the number of points that the user has acquired this time, from the point issuance terminal 15-1 (S605).

Then the acquisition history recording unit 210 records the history of the number of points acquired by the number-of-points acquiring unit 230, in association with shop identification information identifying a shop to which payment by the shop points is allowed, and a term of validity of the shop points (S610). When the term of validity recorded in the acquisition history recording unit 210 has expired, the term-of-validity judgment unit 240 performs processing to invalidate the shop points corresponding to the expired term of validity, in the acquisition history recording unit 210 (S620).

The exchange rate computation unit 260 updates each coefficient of the functions stored in the function storage unit 250, based on change in the issued house point (IHP), the used house point (UHP), the active house point (AHP), and so on, for each shop (S630). The point remaining amount display unit 290 computes the total number of acquired points being a total of the dealt amount of the acquired shop points for each piece of the shop identification information recorded in the acquisition history recording unit 210 (S640). Then the point remaining amount display unit 290 sends the total number of acquired points for each shop having been computed, to the portable telephone 30-1, for display on the screen of the portable telephone 30-1.

Figure 7:
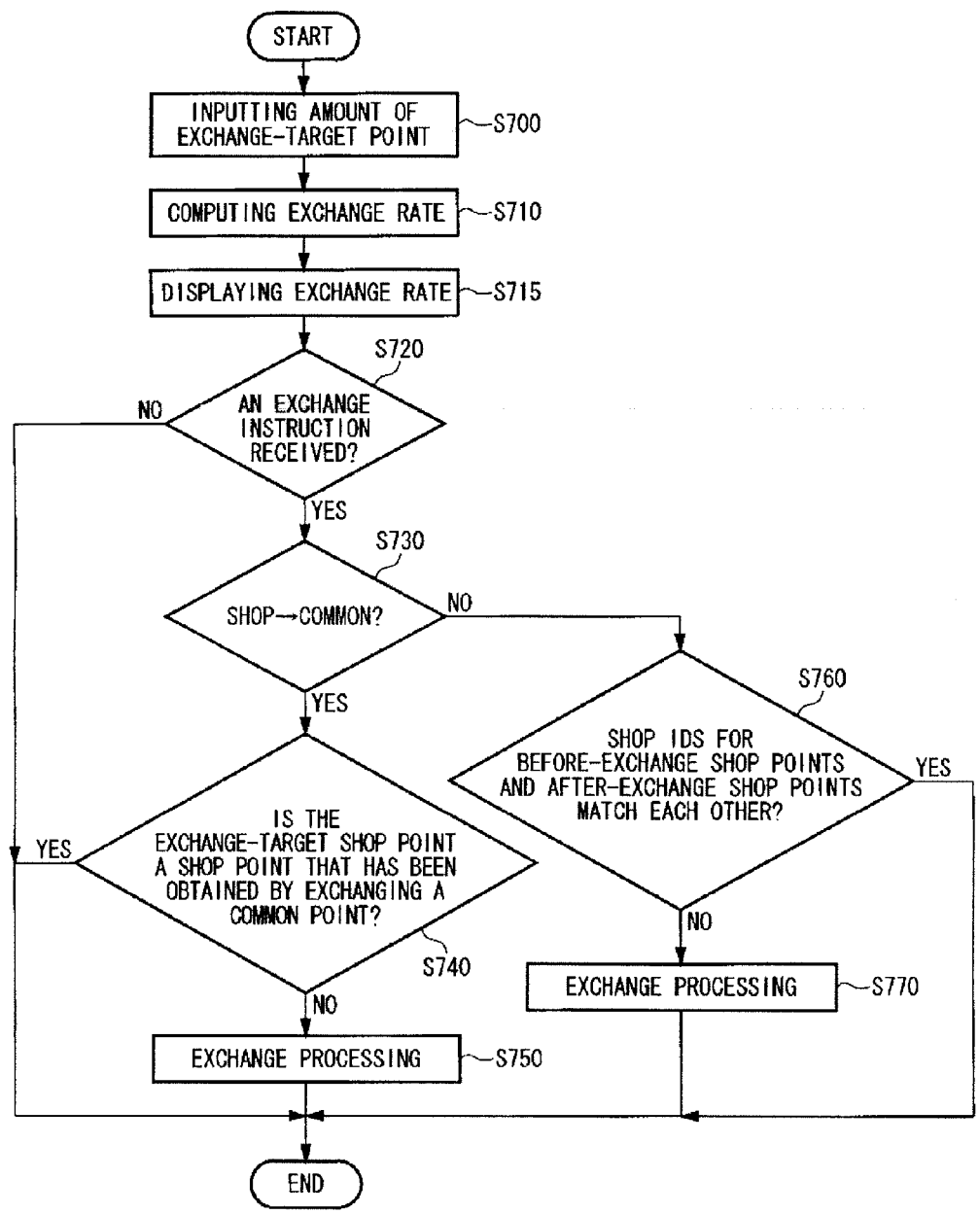
FIG. 7 shows an operational flow of processing performed each time the point management apparatus 20 receives an instruction from a portable telephone 30-1.

FIG. 7 shows an operational flow of processing performed each time the point management apparatus 20 receives an instruction from the portable telephone 30-1. The exchange rate computation unit 260 inputs the amount of shop points or common points that are a target of exchange, from the portable telephone 30-1 (S700). Then for each shop to which the shop points are to be paid, the exchange rate computation unit 260 computes an exchange rate by means of the function for the shop stored in the function storage unit 250, based on the used house point (UHP) and the active general point (AGP) for the shop (S710).

For example, the exchange rate computation unit 260 may compute, as the exchange rate, a ratio of the amount of common points obtained by exchanging the amount of exchange-target shop points, with respect to the amount of exchange-target shop points. Then the exchange rate computation unit 260 displays the computed exchange rate in the portable telephone 30-1 (S715). Next, the exchange rate computation unit 260 judges whether an exchange instruction either for exchanging shop points into common points, or for exchanging common points into shop points has been received (S720).

When such an exchange instruction has been received (S720: YES), the exchange rate computation unit 260 judges whether the exchange instruction is for exchanging shop points into common points (S730). If the judgment is in the affirmative (i.e. when the exchange instruction is for exchanging shop points into common points) (S730:YES), the exchange rate computation unit 260 judges whether the exchange-target shop points are shop points that have been obtained by exchanging common points in the past (S740).

If the judgment is in the negative (i.e. if the exchange-target shop points are not shop points that have been obtained by exchanging common points in the past) (S740: NO), the exchange rate computation unit 260 performs processing to exchange the shop points into common points (S750). Specifically, the exchange rate computation unit 260 updates the data recorded either in the shop point storage unit 200 or in the acquisition history recording unit 210.

On the other hand, when receiving a re-exchange instruction that instructs to exchange common points into shop points (S730: NO), the exchange rate computation unit 260 acquires shop identification information of a shop that issued the before-exchange shop points corresponding to the common points, from the acquisition history recording unit 210 (S760). Then the exchange rate computation unit 260 judges whether the acquired shop identification information matches the shop identification information of the shop to which the after-exchange shop points are directed.

On condition that the shop that issued the before-exchange shop points and the shop to which the after-exchange shop points are directed do not match each other (S760: NO), the exchange rate computation unit 260 performs processing to exchange the common points into shop points (S770). Specifically, the exchange rate computation unit 260 may update the already-exchange indication information corresponding to the exchange-target common points having been recorded in the acquisition history recording unit 210, with the shop identification information of the shop to which the after-exchange shop points are directed.

Figure 8A:
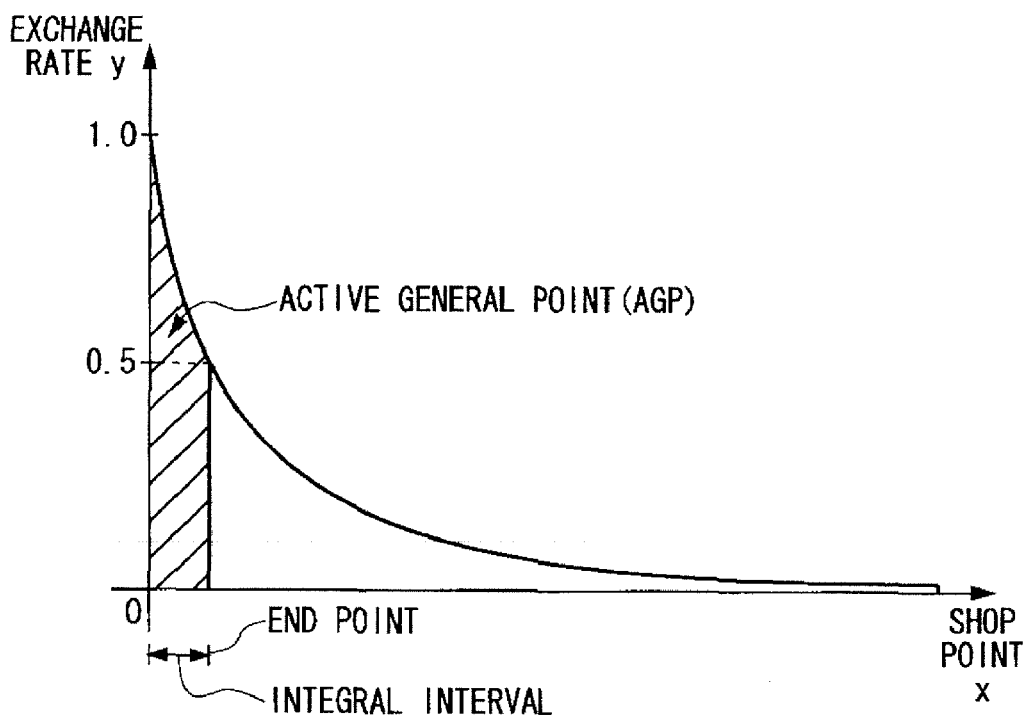
FIGS. 8(a) and 8(b) show the first example of processing for computing an exchange rate in S710.
Figure 8B:

FIGS. 8(a) and 8(b) show the first example of processing for computing an exchange rate in S710. In the present example, processing performed in a case where the exchange-target shop point is 1 point is explained. FIG. 8(a) illustrates an overview explaining the computation processing of the exchange rate on a graph. When being instructed to compute an exchange rate, the exchange rate computation unit 260 first reads the function of the exchange rate corresponding to the computation-target shop from the function storage unit 250.

In addition, the exchange rate computation unit 260 reads the active general point (AGP) of the computation-target shop from the shop point storage unit 200.

Then using the read function, the exchange rate computation unit 260 obtains a shop point corresponding to an end point of an integral interval of which the integral value obtained by integration from the maximum exchange rate is equal to the active general point (AGP). For example in the example of this drawing, the area of the shadow portion corresponds to the active general point (AGP). Then the exchange rate computation unit 260 computes a function value corresponding to the end point of the integral interval, as the exchange rate. In the example of this drawing, the exchange rate takes a value in the vicinity of 0.5.

FIG. 8(b) is an expressional presentation of the processing for computing the exchange rate. A function used in computing the exchange rate is predetermined (i.e. expression (1)). In other words, as shown in FIGS. 4(a) and 4(b), the coefficients "a", "b", and "c" are uniquely defined by the used house point (UHP), the issued house point (IHP), the active house point (AHP), and so on. Then an equation is created in which a beginning point of the integral interval is 0, the end point thereof is $\alpha$, and the integral value changes in accordance with the change in the value of $\alpha$ (i.e. expression (2)). This integral value corresponds to the active general point (AGP) (i.e. expression (3)). By solving this equation, the exchange rate computation unit 260 is able to obtain $\alpha$ being the end point of the integral interval, and the value of the exchange rate (i.e. $f(\alpha)$) that corresponds to this $\alpha$.

As described above, according to the computation processing in this drawing, the exchange rate computation unit 260 is able to compute a lower exchange rate when the active general point (AGP) is larger in amount. In other words, according to the circulation trend of the common points, the exchange rate computation unit 260 is able to compute a lower exchange rate when the issued general point (IGP) is larger in amount, and compute a higher exchange rate when the used general point (UGP) is larger in amount. In addition, according to this computation method, it becomes possible to compute an exchange rate for each shop so that the upper limit of the active general point (AGP) for the shop is the amount obtained by multiplying the active house point (AHP) of the shop by the ratio of the used house point (UHP) with respect to the issued house point (IHP) for the shop.

Figure 9A:
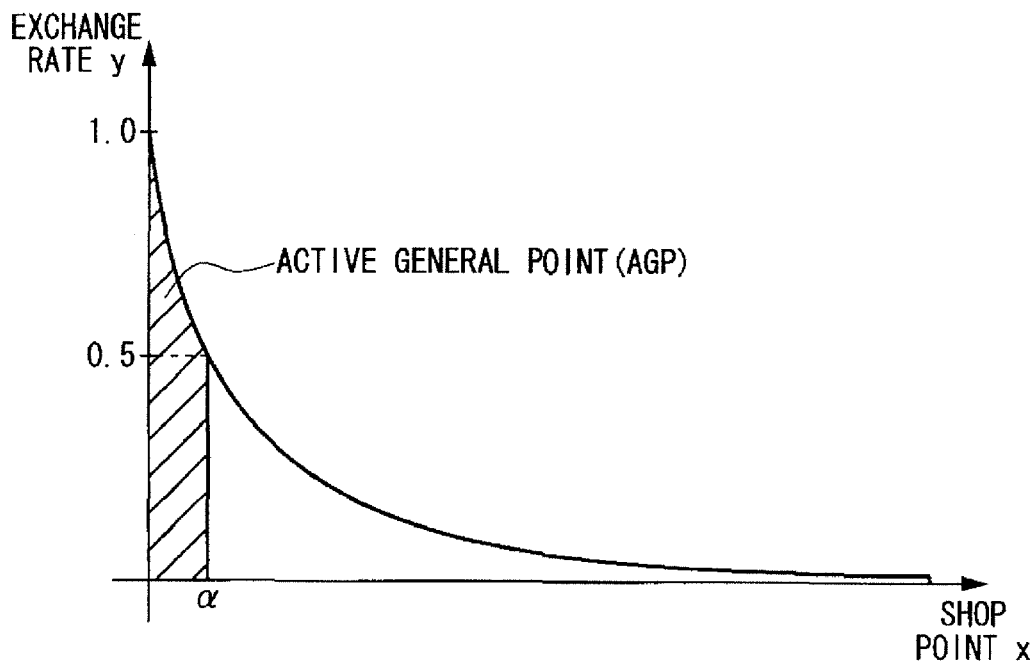
FIGS. 9(a) and 9(b) show the second example of processing for computing the exchange rate in S710.
Figure 9B:
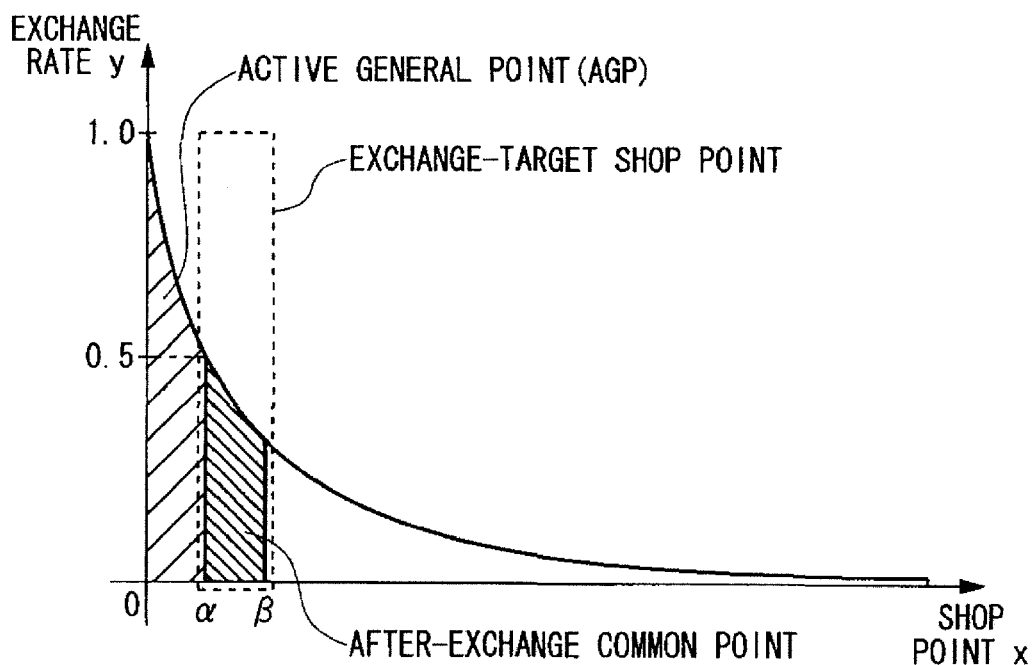

FIGS. 9(a) and 9(b) show the second example of processing for computing the exchange rate in S710. In the present example, processing performed in a case where the exchange-target shop point is 2 points or above is explained. As shown in FIG. 9(a), the exchange rate computation unit 260 first computes the exchange rate used in exchanging 1 shop point, by means of the same processing as the processing shown in FIGS. 8(a) and 8(b).

Next, the exchange rate computation unit 260 obtains a value obtained by adding the amount of the exchange-target shop points to the computed $\alpha$, and sets the resulting value as $\beta$. In other words, $(\beta-\alpha)$ indicates the amount of exchange-target shop points, which corresponds to the area of the dot-line region in the drawing. Next, the exchange rate computation unit 260 computes the integral value obtained by integrating the function for the exchange rate in the integral interval from $\alpha$ to $\beta$, as the amount of the common points after the exchange.

Then the exchange rate computation unit 260 computes the ratio of the amount of after-exchange common points with respect to the amount of exchange-target shop points, and sets the computed ratio as the exchange rate. In this way, it becomes possible to compute an adequate exchange rate that is in accordance with the amount of exchange-target shop points, with accuracy and in advance to the exchange processing, for display to a user.

As described above in conjunction with the drawings from FIG. 7 to FIG. 9, according to the point management apparatus 20, it becomes possible to fluctuate the exchange rate to an adequate value, by taking into account not only the circulation trend of the shop points but also the circulation trend of the common points. Accordingly, it becomes possible to maintain the balance between demand/supply of the shop points and the common points, thereby refraining from exchanging shop points into common points as necessary. In addition, it is possible to control the amount of common points issued by each shop, according to the reliability of the shop. For example, it becomes possible to prevent a shop with little experience of accepting payment by means of shop points from issuing a large amount of common points that exceeds the reliability of the shop.

In addition, when the exchange rate fluctuates in this way, by allowing input of the amount of exchange-target points, it becomes possible to accurately compute the exchange rate prior to the exchange processing, and to display it to the user. Furthermore, it is possible to prevent exchange any common points having been obtained from exchange from shop points into shop points of the same shop again. This results in prevention of an operation attempting to raise profit only by repeating exchange between common points and shop points, thereby facilitating a fair utilization of the point service.

Figure 10:
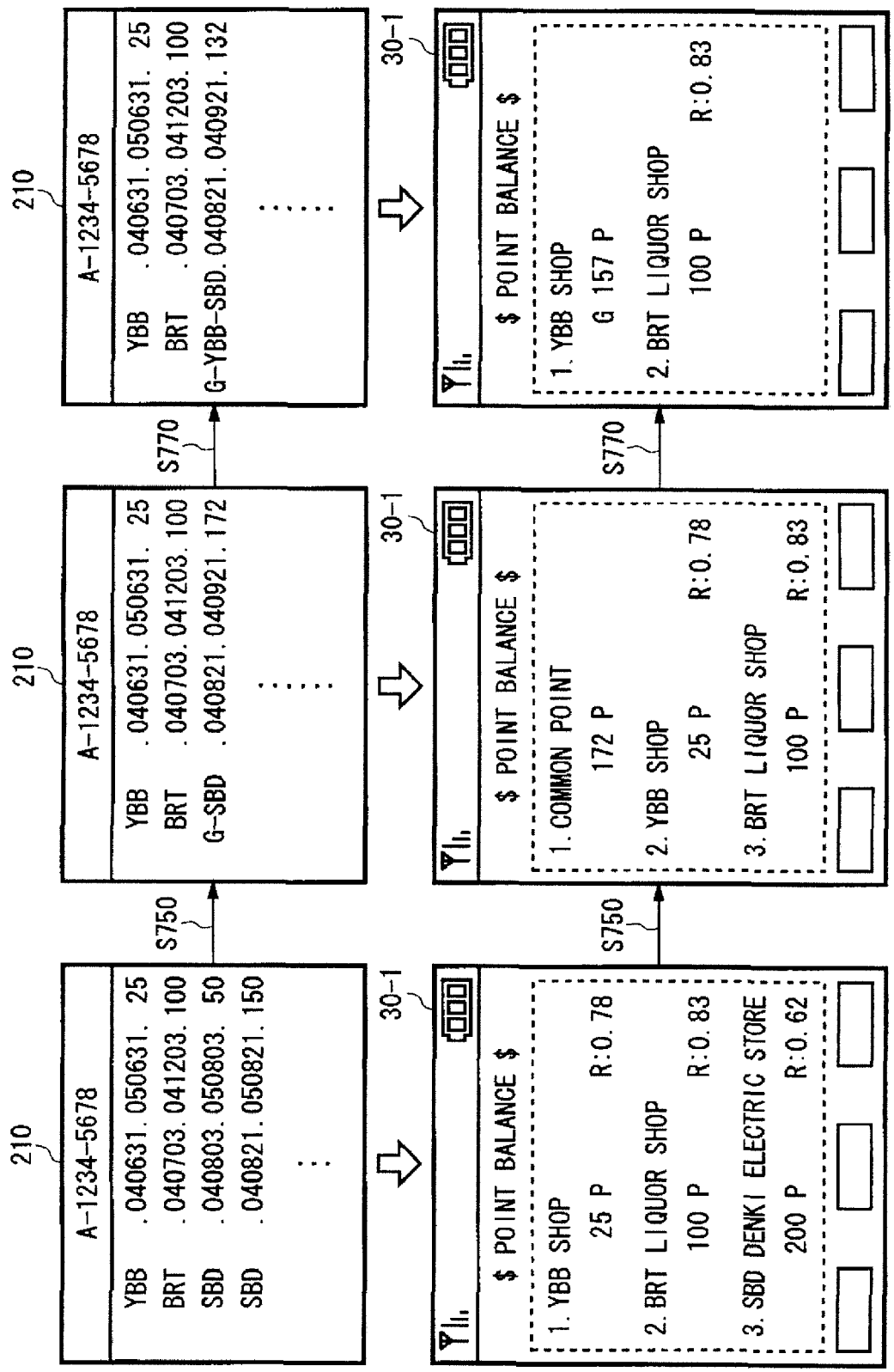
FIG. 10 shows one example of exchange processing performed between shop points and common points, in S750 and S770.

FIG. 10 shows one example of exchange processing performed between shop points and common points, in S750 and S770. The acquisition history recording unit 210 stores therein, in association with a tag ID identifying a user and for each set of shop points acquired by the user, shop identification information identifying a shop to which the shop points are usable, information indicating an issue date on which the shop points have been issued, a term of validity of the shop points as payment, and the number of acquired shop points, in correspondence. For example, this user first acquired 50 points for the SBD Denki electric store, and later obtained 150 points.

The point remaining amount display unit 290 computes the total number of acquired points being a total of the acquired shop points, for each piece of shop identification information recorded in the acquisition history recording unit 210, and displays the computed total number of acquired points for each shop. As a result, the shop points for the SBD Denki electric store will be summed up, thereby leading to display as 200 points in the portable telephone 30-1.

Here in S750, the point exchange processing unit 280 performs processing to exchange the shop points for the SBD Denki electric store altogether into common points, based on an instruction of the user having been received via the portable telephone 30-1. Specifically, the point exchange processing unit 280 causes the acquisition history recording unit 210 to record the already-exchanged indication information "G" indicating that exchange into common points has been already done, by assigning the already-exchanged indication information "G" to the top of the piece of shop identification information. As a result, the acquisition history recording unit 210 records the common points instead of two sets of shop points for the SBD Denki electric store.

Moreover since the sum of the exchange-target shop points is 200 and the exchange rate is less than 1, the after-exchange common points will be 172, which is less than 200. In response, the portable telephone 30-1 displays 172 points as the total number of acquired common points, instead of the total number of acquired points for the SBD Denki electric store.

In S770, the point exchange processing unit 280 performs processing to exchange the common points into shop points for the YBB Shop, based on an instruction of the user received via the portable telephone 30-1. Specifically, the point exchange processing unit 280 causes the acquisition history recording unit 210 to record information indicating exchange has been further performed from common points, shop identification information of a shop to which the after-exchange shop points are directed, and shop identification information of a shop that issued the before-exchange shop points. As a result, the acquisition history recording unit 210 records the shop points indicated by "G-YBB-SBD" instead of the common points indicated by "G-SBD".

In response, the point remaining amount display unit 290 displays, in the portable telephone 30-1, the total number of acquired points being a sum of the already acquired points for the YBB Shop and the points for the YBB Shop newly acquired as a result of the exchange.

As described above, as shown in this drawing, the acquisition history recording unit 210 records the shop identification information of the shop that issued the before-exchange shop points, even when the shop points have been exchanged into common points. Accordingly, it becomes possible to check from which shop's shop points, particular common points have been exchanged, thereby preventing common points exchanged from shop points from being exchanged to the same shop's shop points again. On the other hand, the point remaining amount display unit 290 displays, to a user, a sum obtained by summing shop points for each shop. Accordingly, an interface easily comprehensible for a user is provided.

As described above, as shown in the present embodiment, the point management apparatus 20 is able to realize a point service for various shops by means of a single apparatus such as a portable telephone, without necessitating a conventionally-used point card. Furthermore according to the point management apparatus 20, it becomes possible to define an adequate value of a point issued by each shop, in accordance with the circulation trend of points. Accordingly, it becomes possible to exchange shop points issued in a shop, into shop points for another shop, to lead to efficacy improvement of the value of a point and of the point service.

Figure 11:
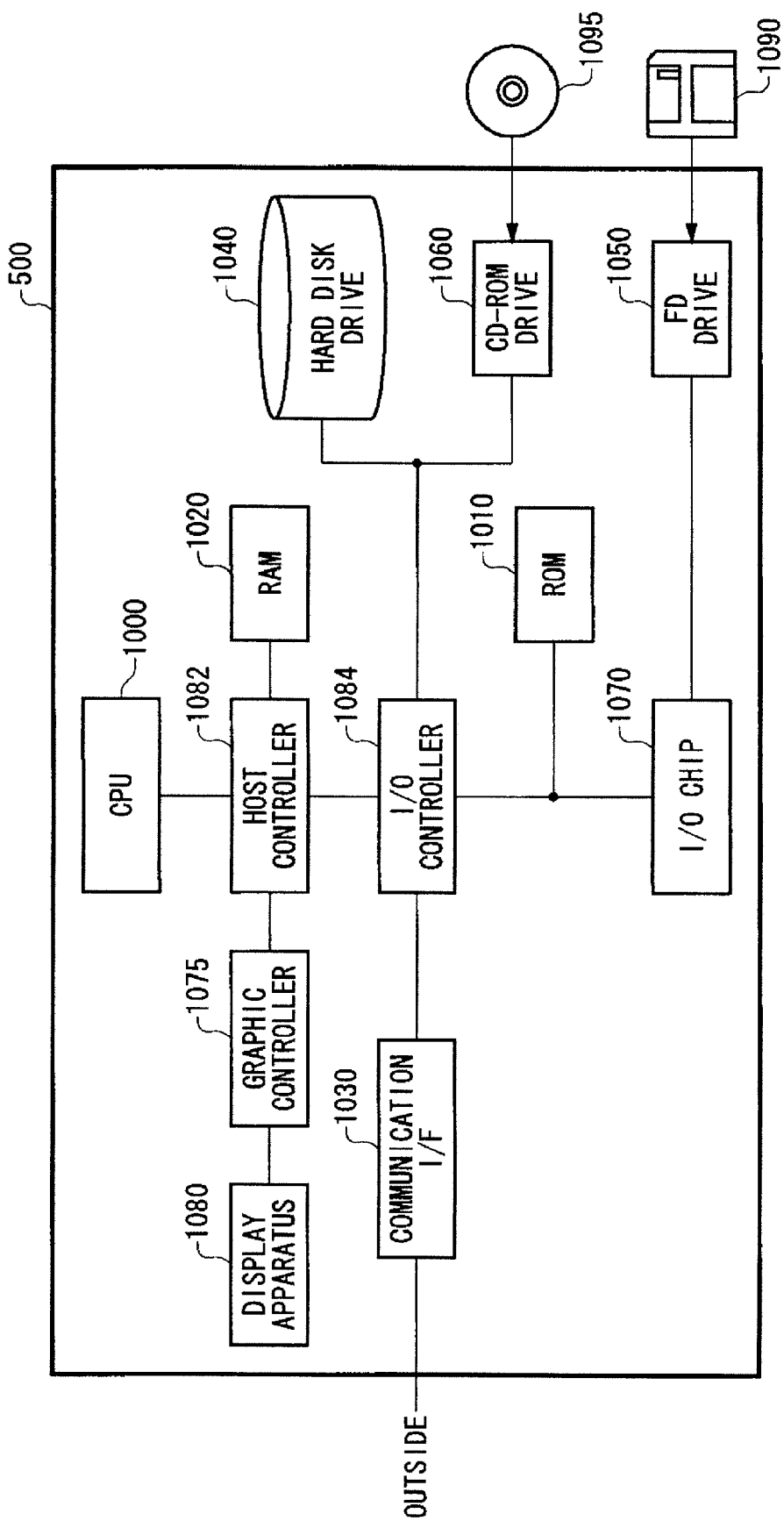
FIG. 11 shows one example of a hardware configuration of a computer 500 that functions as the point management apparatus 20.

FIG. 11 shows one example of a hardware configuration of a computer 500 functioning as the point management apparatus 20. The computer 500 includes a CPU periphery having a CPU 1000, a RAM 1020, a graphic controller 1075 which are connected with each other through a host controller 1082, an input/output unit having a communication interface 1030, a hard disk drive 1040 and a CD-ROM drive 1060 which are connected to the host controller 1082 through an input/output controller 1084, and a legacy input/output unit having a BIOS 1010, a flexible disk drive 1050 and an input/output chip 1070 which are connected to the input/output controller 1084.

The host controller 1082 connects the RAM 1020 to the CPU 1000 and the graphic controller 1075 which access the RAM 1020 with a high transfer rate. The CPU 1000 operates according to the programs stored in the BIOS 1010 and the RAM 1020 to control each unit. The graphic controller 1075 acquires image data generated on a frame buffer provided in the RAM 1020 by the CPU 1000 or the like and displays the same on a display apparatus 1080. Alternatively, the graphic controller 1075 may include therein a frame buffer for storing image data generated by the CPU 1000 or the like.

The input/output controller 1084 connects the host controller 1082 to the communication interface 1030, the hard disk drive 1040 and the CD-ROM drive 1060 which are relatively high-speed input/output apparatuses. The communication interface 1030 communicates with external apparatuses through a network. The hard disk drive 1040 stores a program and data used by the computer 500. The CD-ROM drive 1060 reads a program or data from the CD-ROM 1095 and provides the same to the input/output chip 1070 through the RAM 1020.

The BIOS 1010 and relatively low-speed input/output apparatuses such as the flexible disk drive 1050 and input/output chip 1070 are connected to the input/output controller 1084. The BIOS 1010 stores a boot program executed by the CPU 1000 at activating the computer 500, a program depending on the hardware of the computer 500, and the like. The flexible disk drive 1050 reads a program or data from a flexible disk 1090 and provides the same to the input/output chip 1070 through the RAM 1020. The input/output chip 1070 connects various input/output apparatuses through the flexible disk 1090, and a parallel port, a serial port, a keyboard port, a mouse port, or the like, for example.

A program provided to the computer 500 is provided by a user by being stored in a recording medium such as the flexible disk 1090, the CD-ROM 1095, or an IC card. The program is executed by being read from the recording medium and installed in the computer 500, via the input/output chip 1070 and/or the input/output controller 1084. Operations that the program causes the computer 500 and so on to perform by acting on the computer 500 are the operations performed by the point management apparatus 20 which have been described in conjunction with the drawings from FIG. 1 to FIG. 10, and so the explanation thereof is omitted here.

The above-shown program may be stored in an external recording medium. The recording medium may be, besides the flexible disk 1090 and the CD-ROM 1095, an optical recording medium such as a DVD and a PD, a magnetooptical recording medium such as an MD, a tape medium, and a semiconductor memory such as an IC card, and so on. In addition, the recording medium may also be a recording apparatus such as a hard disk or a RAM provided in a server system connected to a dedicated communication network or to the Internet, for providing a program to the computer 500 through the network.

While the present invention has been described with the embodiment, the technical scope of the invention is not limited to the scope of the above described embodiment. It is apparent to a person skilled in the art that various alteration and improvements may be added to the above-described embodiment. It is apparent from the scope of the claims that the embodiment to which such alternation or improvements are added can be included in the technical scope of the invention.

What is claimed is:

1. A computation apparatus for computing an exchange rate used in exchanging one or more shop points into one or more common points, the shop points being issued for each shop and usable for payment to the shop, and the common points being usable for payment common to each shop, the computation apparatus comprising:

a shop point storage unit that stores, in association with each shop, a used house point (UHP) and an active common point (ACP), the used house point (UHP) representing a portion of shop points issued by the shop and has been already used for payment to the shop, and the active common point (ACP) representing a portion of common points that is exchanged from shop points issued by the shop and has not been yet used for payment to any shop;

a function storage unit that stores, for each shop, a function for an exchange rate that a) when the used house point (UHP) of the shop is larger, computes an exchange rate with which shop points of the shop are exchanged into a larger number of common points, and b) when the active common point (ACP) of the shop is larger, computes an exchange rate with which shop points of the shop are exchanged into a smaller number of common points; and an exchange rate computation unit that, for each shop, computes an exchange rate, based on the used house point (UHP) and the active common point (ACP) of the shop stored in the shop point storage unit and by using the function of the shop stored in the function storage unit.

2. The computation apparatus as set forth in claim 1, wherein the shop point storage unit further stores, for each shop, an issued house point (IHP) and an active house point (AHP), the issued house point (IHP) representing an amount of shop points issued by the shop, and the active house point (AHP) representing a portion of the issued house point (IHP) not yet used for any of payment and exchange, the function stored by the function storage unit is an attenuation function that yields, for each shop, an exchange rate that decreases according to increase in exchange-target shop points for the shop, the function having a tendency of a) yielding a greater attenuation rate when a ratio of the used house point (UHP) to the issued house point (IHP) for the shop is lower, b) yielding a greater attenuation rate when the active house point (AHP) for the shop is larger, and c) yielding a smaller attenuation rate when both of the used house point (UHP) and the issued house point (IHP) increase, and the exchange rate computation unit, using the attenuation function, obtains a shop point corresponding to an end point of an integral interval of which an integral value obtained by integration from a maximum exchange rate is equal to the active common point (ACP), and computes, as the exchange rate, a function value of the attenuation function that corresponds to the end point of the integral interval.

3. The computation apparatus as set forth in claim 2, wherein when an amount of exchange-target shop points is designated, the exchange rate computation unit computes a ratio of an amount of common points obtained by exchanging the designated amount of exchange-target shop points with respect to the designated amount of exchange-target shop points, as the exchange rate.

4. The computation apparatus as set forth in claim 3, further comprising:

a user point storage unit that stores, for each user, an amount of shop points owned by the user, and an amount of common points owned by the user; and a point exchange processing unit that a) adds, to the amount of common points stored in the user point storage unit, a value obtained by multiplying the amount of exchange-target shop points by the exchange rate, and b) subtracts the amount of exchange-target shop points, from the amount of shop points stored in the user point storage unit.

5. The computation apparatus as set forth in claim 4, wherein
the point exchange processing unit a) adds, to the amount of shop point stored in the user point storage unit, a value obtained by multiplying an amount of exchange-target common points by an inverse number of the exchange rate, and b) subtracts the amount of exchange-target common points, from the amount of common points stored in the user point storage unit.

6. The computation apparatus as set forth in claim 4, wherein
when any shop points are exchanged into common points, the point exchange processing unit further updates the active common point (ACP) stored in the shop point storage unit.

7. The computation apparatus as set forth in claim 2, wherein
the function storage unit stores a function whose coefficient is defined based on at least one of a predetermined exchange-rate upper-limit value and a predetermined exchange-rate lower-limit value.

8. The computation apparatus as set forth in claim 7, wherein
the function storage unit stores, for each shop, a function for an exchange rate that sets, as an upper limit value of the active common point (ACP) of the shop, an amount obtained by multiplying the active house point (AHP) for the shop by a ratio of the used house point (UHP) with respect to the issued house point (IHP) for the shop.

9. A computation method for computing an exchange rate used in exchanging one or more shop points into one or more common points, the shop points being issued for each shop and usable for payment to the shop, and the common points being usable for payment common to each shop, the computation method comprising using a computer to perform the steps of:
a shop point storing step of storing, in association with each shop, a used house point (UHP) and an active common point (ACP), the used house point (UHP) representing a portion of shop points issued by the shop and has been already used for payment to the shop, and the active common point (ACP) representing a portion of common points that is exchanged from shop points issued by the shop and has not been yet used for payment to any shop;
a function storing step of storing, for each shop, a function for an exchange rate that a) when the used house point (UHP) of the shop is larger, computes an exchange rate with which shop points of the shop are exchanged into a larger number of common points, and b) when the active common point (ACP) of the shop is larger, computes an exchange rate with which shop points of the shop are exchanged into a smaller number of common points; and
an exchange rate computation step of, for each shop, computing an exchange rate, based on the used house point (UHP) and the active common point (ACP) of the shop stored in the shop point storing step and by using the function of the shop stored in the function storing step.

10. A computer readable medium having a computer program stored thereon, which, when executed, causes a computer to function as a computation apparatus for computing an exchange rate used in exchanging one or more shop points into one or more common points, the shop points being issued for each shop and usable for payment to the shop, and the common points being usable for payment common to each shop, the program causing the computer to function as:
a shop point storage unit that stores, in association with each shop, a used house point (UHP) and an active common point (ACP), the used house point (UHP) representing a portion of shop points issued by the shop and has been already used for payment to the shop, and the active common point (ACP) representing a portion of common points that is exchanged from shop points issued by the shop and has not been yet used for payment to any shop;
a function storage unit that stores, for each shop, a function for an exchange rate that a) when the used house point (UHP) of the shop is larger, computes an exchange rate with which shop points of the shop are exchanged into a larger number of common points, and b) when the active common point (ACP) of the shop is larger, computes an exchange rate with which shop points of the shop are exchanged into a smaller number of common points; and
an exchange rate computation unit that, for each shop, computes an exchange rate, based on the used house point (UHP) and the active common point (ACP) of the shop stored in the shop point storage unit and by using the fUnction of the shop stored in the function storage unit.

* * * * *